(12) United States Patent
Amano et al.

(10) Patent No.: US 8,064,747 B2
(45) Date of Patent: Nov. 22, 2011

(54) REPRODUCING DEVICE AND REPRODUCING METHOD

(75) Inventors: Hiroshi Amano, Tokyo (JP); Masahiro Nobori, Kanagawa (JP); Shoji Shirakawa, Tokyo (JP)

(73) Assignee: Sony Corporation, Tokyo (JP)

(*) Notice: Subject to any disclaimer, the term of this patent is extended or adjusted under 35 U.S.C. 154(b) by 1294 days.

(21) Appl. No.: 11/407,050

(22) Filed: Apr. 20, 2006

(65) Prior Publication Data

US 2006/0245734 A1 Nov. 2, 2006

(30) Foreign Application Priority Data

Apr. 28, 2005 (JP) ................. 2005-131539

(51) Int. Cl.
*H04N 9/80* (2006.01)
*H04N 5/765* (2006.01)
*H04N 5/76* (2006.01)
*H04N 7/14* (2006.01)
*H04N 5/38* (2006.01)

(52) U.S. Cl. ........ 386/239; 386/248; 386/235; 386/231; 386/200; 348/14.01; 348/14.04; 348/21

(58) Field of Classification Search ............... 386/1, 46, 386/95, 123–126, 239, 248, 235, 231, 200; 348/14.01, 14.04, 21
See application file for complete search history.

(56) References Cited

U.S. PATENT DOCUMENTS

| | | | | |
|---|---|---|---|---|
| 5,566,237 A | * | 10/1996 | Dobbs et al. | 381/103 |
| 7,590,412 B2 | * | 9/2009 | Sakamoto | 455/414.1 |
| 2004/0101289 A1 | * | 5/2004 | Watanabe | 386/125 |

FOREIGN PATENT DOCUMENTS

| | | |
|---|---|---|
| DE | 199 39 631 A1 | 2/2001 |
| DE | 101 56 954 A1 | 6/2003 |
| JP | 62-198728 U | 12/1987 |
| JP | 11-296167 | 10/1999 |
| JP | 2002-300238 | 10/2002 |
| JP | 2004-172881 | 6/2004 |

OTHER PUBLICATIONS

D. Teichner, "Netzwerk-Konzepte Für Video-und Audiofunktionen im Auto", Fernseh Und Kino-technik, vol. 54, No. 3, XP-000966342, Mar. 2000, pp. 199-120 and 122-124. A. Ibenthal, et al., "Multimedia im Fahrzeug: Dienste und Technik", Fernseh Und Kino-technik, vol. 54, No. 3, XP-000966339, Mar. 2000, pp. 100-105.
Office Action issued Jan. 25, 2011, in Japan Patent Application No. 2005-131539 (with English translation).
Office Action issued Jun. 14, 2011, in Japanese Patent Application No. 2005-131539, filed Apr. 28, 2005.

* cited by examiner

*Primary Examiner* — Thai Tran
*Assistant Examiner* — Daquan Zhao
(74) *Attorney, Agent, or Firm* — Oblon, Spivak, McClelland, Maier & Neustadt, L.L.P.

(57) ABSTRACT

The present invention allows a reproducing device that can be used in various device environmental conditions to execute adequate output operation according to a device environmental condition. When reproducing a content signal of audio and video, a reproducing device determines a device environmental condition as the coupling state of the reproducing device and surroundings of the reproducing device. Subsequently, the reproducing device implements control according to output part information and control information that are set with being associated with the device environmental condition. Based on the output part information, either or both of a main-body output unit and an external output unit are controlled as a part for outputting audio or video. In addition, control corresponding to the registered control information is executed inside the device, or details of the control are indicated to a coupled external device.

18 Claims, 9 Drawing Sheets

| DEVICE ENVIRONMENTAL CONDITION | VIDEO OUTPUT PART | AUDIO OUTPUT PART | VOLUME LEVEL |
|---|---|---|---|
| HANDY | MAIN-BODY DISPLAY | MAIN-BODY SPEAKER | 1 |
| CAR/STOP | MAIN-BODY & REAR DISPLAYS | F/R SPEAKERS | 5 |
| CAR/RUN | REAR DISPLAY | REAR SPEAKER | 7 |
| HOME | HOME DISPLAY | HOME SPEAKER | 3 |

REPRODUCING DEVICE AND REPRODUCING METHOD

CROSS REFERENCES TO RELATED APPLICATIONS

The present invention contains subject matter related to Japanese Patent Application JP 2005-131539 filed in the Japanese Patent Office on Apr. 28, 2005, the entire contents of which being incorporated herein by reference.

BACKGROUND OF THE INVENTION

The present invention relates to devices and methods for reproducing audio signals and video signals such as content signals, and particularly to a reproducing device used in various kinds of device environmental conditions and a reproducing method in the reproducing device.

Related arts of the invention are disclosed in e.g. Japanese Patent Laid-open Nos. 2005-39019 and 2004-140686.

In recent years, display devices as output units for in-vehicle use are being improved to achieve a higher performance and more functions, and devices that do not serve merely as a display unit but are provided with a storage unit, a reproducing and processing unit, a speaker, etc. combined with the display unit have been developed.

In addition, a proposal has also been made to use this improved display device not only as a device for in-vehicle use but also as a portable reproducing device that can reproduce video and audio content alone and a device used in combination with a home audio visual (AV) system.

That is, the recent improved device goes beyond mere an in-vehicle display unit and functions as a reproducing device that can be used in various device environmental conditions: an in-vehicle condition, an out-vehicle condition, an in-home condition, etc.

SUMMARY OF THE INVENTION

However, such a reproducing device inevitably needs to include a small speaker for outputting audio and a small display panel for outputting video in consideration of its portability.

When the reproducing device is carried as a portable device, it is obvious that audio and video content is output only from its speaker and display although they are small. However, when the device is used in a home or in a car for example, a user frequently feels that satisfactory reproduced output cannot be obtained.

When the reproducing device is used in a home, a user inevitably compares output from the device with output from high-performance speaker and monitor display in an AV system in the home. When the device is used in a car, a user inevitably makes a comparison with a speaker in a car audio system. As a result, the user feels that video and audio reproduced by the reproducing device are not enough.

Furthermore, there has also been a recent popularization of vehicles that are equipped with, besides a navigation monitor for a driver seat, a display unit that allows passengers other than the driver to watch TV broadcast video and reproduced video through its rear monitor, rear speaker and so forth.

When the above-described reproducing device is used in a vehicle equipped with such a car AV system, it is required for the device to offer adequate usability. For example, safety during the running of the vehicle and effective use of the system are required.

Specifically, in use of a reproducing device that can be used under various device environmental conditions such as an in-vehicle condition, an out-vehicle condition, and an in-home condition, there are the following demands: adequate and effective usage under various device environmental conditions, acquisition of user's satisfaction with reproduced output, and compatibility with individual environmental circumstances, such as securing of safety during vehicle travel.

Therefore, there is a need for providing a reproducing device that can be used under various device environmental conditions and operates adequately depending upon the device environmental condition.

According to a first embodiment of the invention, there is provided a reproducing device including reproducing means that reproduces an audio signal and/or a video signal, and main-body output means that is provided for a main body of the reproducing device, and serves as an output part for a video signal or an audio signal reproduced by the reproducing means. The reproducing device also includes external output means that outputs a video signal or an audio signal to an external device coupled to the reproducing device, and serves as an output part for a video signal or an audio signal reproduced by the reproducing means, storage means that stores a setting table in which output part information and control information associated with a device environmental condition are registered, and control means that determines a device environmental condition and acquires output part information and control information corresponding to the determined device environmental condition with reference to the setting table. The control means sets an output part for a video signal or an audio signal reproduced by the reproducing means based on the acquired output part information and implements control based on the acquired control information.

The control means determines the state of being coupled to a vehicle apparatus, the state of being coupled to a home apparatus, and the non-coupled state as the device environmental condition. Furthermore, if the control means has determined that the reproducing device is coupled to the vehicle apparatus, the control means also determines whether a vehicle is running or in the stopped state for determining the device environmental condition.

In the setting table, output part information and control information are registered for each of the state where the reproducing device is coupled to a vehicle apparatus and the vehicle is running, the state where the reproducing device is coupled to a vehicle apparatus and the vehicle is in the stopped state, the state where the reproducing device is coupled to a home apparatus, and the non-coupled state, as device environmental conditions.

The reproducing device further includes setting change means that changes the settings of output part information and control information registered in the setting table.

If the control means has determined that the reproducing device is coupled to an external device in the determining of the device environmental condition, the control means outputs a signal based on the control information to the external device to thereby implement the control based on the control information.

According to a second embodiment of the invention, there is provided a reproducing method that includes the steps of determining a device environmental condition, acquiring output part information and control information corresponding to the determined device environmental condition with reference to a setting table in which output part information and control indication associated with a device environmental condition are registered, and setting an output part for a reproduced audio signal and/or a reproduced video signal based on the acquired output part information, and implementing control based on the acquired control information.

In the second embodiment, a device environmental condition is determined when a content signal of audio and video or the like is reproduced. The device environmental condition refers to the coupling state of the reproducing device and surroundings of the reproducing device. In order to determine the device environmental condition, for example, a determination is made as to whether the reproducing device is coupled to an external device or is used alone, and whether a coupled external device is a vehicle apparatus or a home apparatus. In addition, if the reproducing device is coupled to a vehicle apparatus, the situation of the vehicle (e.g., whether the vehicle is running or in the stopped state) is also determined.

The adequate operation condition of the reproducing device differs depending on the device environmental condition. The control means implements control corresponding to output part information and control information according to the device environmental condition. The output part information is information for specifying either or both of the main-body output means and the external output means as a part for outputting audio or video. The control information is information indicating details of control when a content signal is reproduced. The control means executes control corresponding to the registered control information for the device itself, or indicates details of the control to the coupled external device.

According to the embodiments of the invention, in use of a reproducing device, an output part is set depending upon a device environmental condition and a setting table, and control according to the device environmental condition is executed. Thus, adequate operation is executed depending upon the device environmental condition. When the reproducing device is used alone, a reproduced content signal is output through main-body output means. When the reproducing device is coupled to an external device, a reproduced content signal is supplied to the external device so that the content signal is output by use of external display and speaker. When the reproducing device is used with being coupled to a device in a vehicle, preventing the main-body output means from outputting video allows ensuring of an operation condition adequate for keeping safety during driving.

In addition, control based on control information allows the outputting of audio and video suitable for a device environmental condition.

A user does not need to change the settings of the output part and control details every time the place of use changes, which can offer enhanced convenience and provide high-quality and comfortable reproduction output and safe operation conditions with use of home and vehicle systems.

Furthermore, changing the registered contents in the setting table allows settings adequate for a system and equipment used by a user, which can offer optimal operation conditions for each individual user.

DETAILED DESCRIPTION OF THE PREFERRED EMBODIMENTS

Figure 1A:
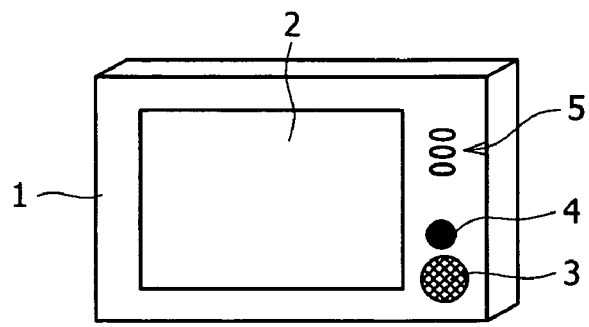
FIGS. 1A to 1C are explanatory diagrams showing the appearance and coupling configurations of a reproducing device according to an embodiment of the present invention.

A reproducing device that can be used alone, in a home, and in a vehicle according to one embodiment of the invention will be described below. The order of the description is as follows.
1. Configuration of Reproducing Device
2. Example of Coupling with Vehicle AV System
3. Example of Coupling with Home AV System
4. Setting Table
5. Output Control Processing
6. Advantageous Effects of Embodiment and Modifications
1. Configuration of Reproducing Device FIG. 1A illustrates an appearance example of a reproducing device 1 of the embodiment.

The reproducing device 1 has such a size as to offer portability, and is provided with a display 2 and a speaker 3. The display 2 is formed of a small display panel such as a liquid crystal panel. The speaker 3 is a small-size speaker that can be mounted on the device 1. Although FIG. 1 illustrates only one speaker 3, the speaker 3 may be stereo speakers disposed on the left and right sides of the device 1. A headphone output terminal may be provided in addition to the speaker 3 or instead of the speaker 3. This display 2 and the speaker 3 serve as a main-body output unit in the reproducing device 1.

Provided on the casing of the reproducing device 1 are an infrared receiver 4 and operating keys 5 for accepting operation input by a user. When a user operates a remote commander (not shown), an infrared operation signal output from the remote commander is received by the infrared receiver 4. The user may also operate the operating keys 5 on the device 1.

The reproducing device 1 may be provided only with either one of the infrared receiver 4 combined with a remote commander and the operating keys 5 on its main body. Alternatively, the reproducing device 1 may be provided with an electric wave receiver combined with a remote commander that outputs electric waves.

Furthermore, instead of the operating keys 5 as keys on the casing, another operating element such as a jog dial or stick may be provided.

Alternatively, an operating part as a touch panel on the screen of the display 2 may be provided. Furthermore, an operating form is also available in which a cursor is moved and any item is clicked in a menu screen or an icon representation indicated on the display 2 through operation of a given pointing device, a remote commander or the operating keys 5.

Moreover, for operation input, a microphone may be provided so that audio can be input to the device 1, and a camera may be provided so that an image can be input to the device 1.

In these cases, the reproducing device 1 may include an audio recognition unit and an image recognition unit, and input audio and images may be supplied to an arithmetic processor 10 to be described later as operation information.

Figure 1B:
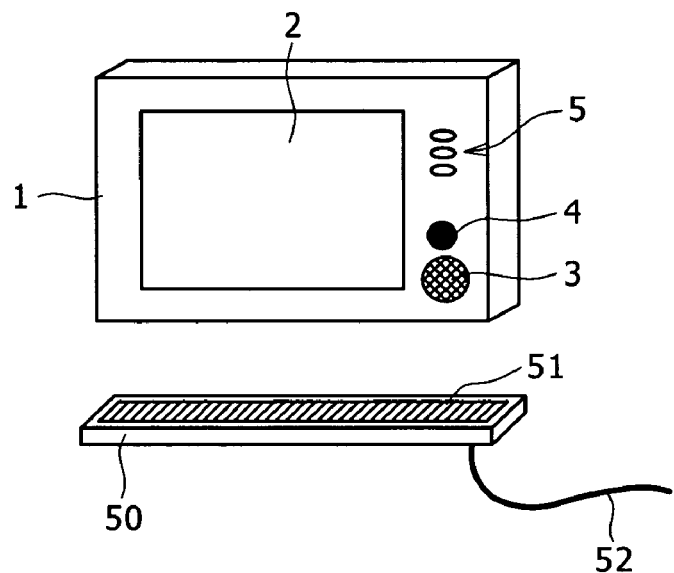

A connector (a connector 24 in FIG. 2) is provided on the lower face of the casing of the reproducing device 1. This connector is coupled to a connector 51 of a cradle 50 of a vehicle AV system (hereinafter, a vehicle cradle) as shown in FIG. 1B, and thus the reproducing device 1 can be coupled to the vehicle AV system via the vehicle cradle 50 and a cable 52.

Figure 1C:
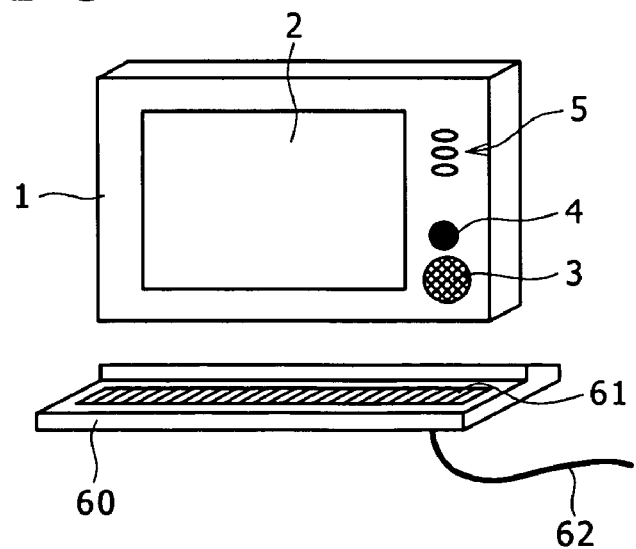

In addition, the connector on the lower face of the casing is coupled to a connector 61 of a cradle 60 of a home AV system (hereinafter, a home cradle) as shown in FIG. 1C, and thus the reproducing device 1 can be coupled to the home AV system via the home cradle 60 and a cable 62.

Figure 2:
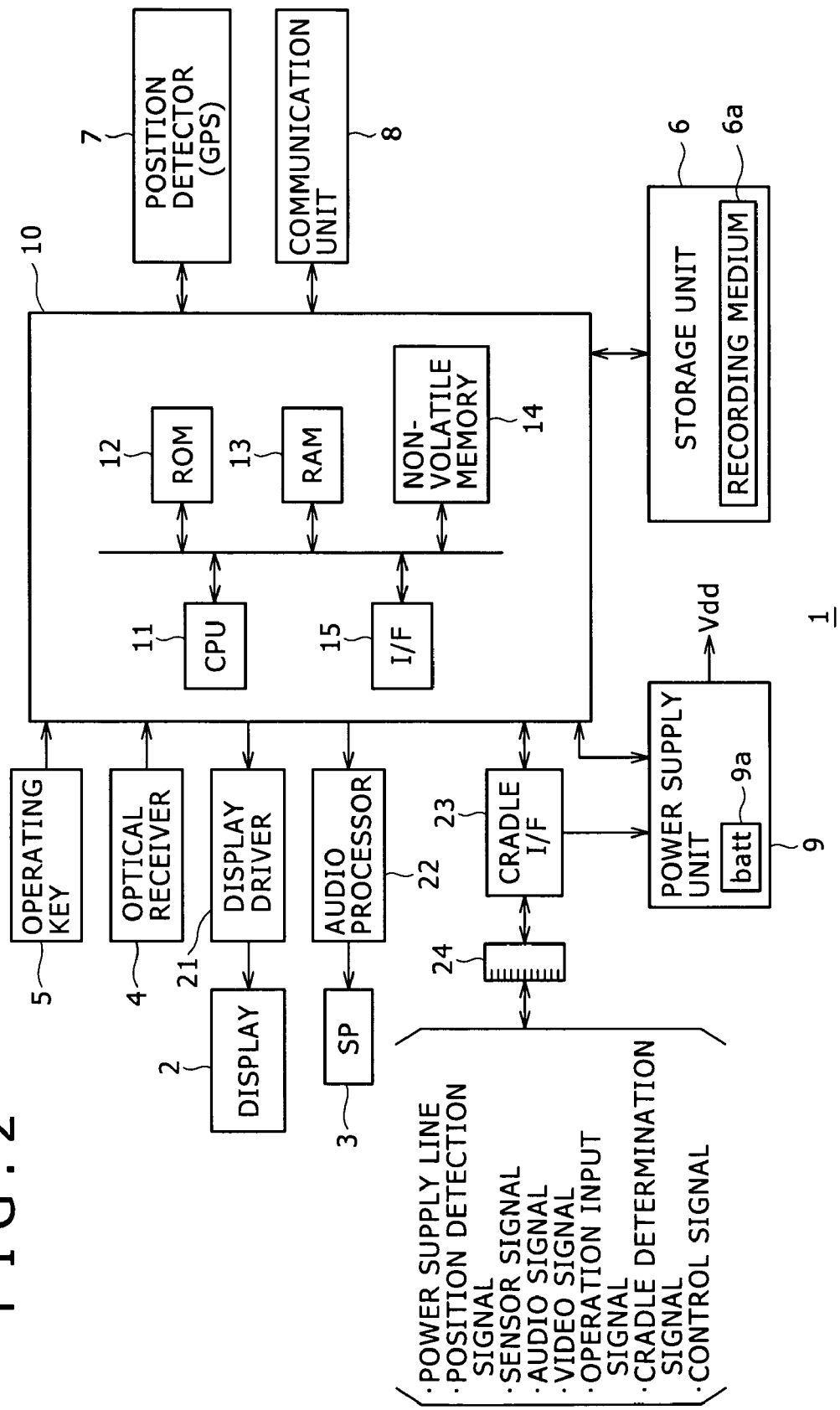
FIG. 2 is a block diagram of the reproducing device of the embodiment.

FIG. 2 illustrates the internal configuration of the reproducing device 1. The reproducing device 1 functions not only as a device for reproducing audio and video content signals but also as a navigation device.

A storage unit 6 in FIG. 2 retrieves data from (and writes data in) a recording medium 6a, and reproduces audio and video content data recorded in the recording medium 6a, navigation data such as map data and POI (Point of Interest) information, and other data.

The storage unit 6 is a disc drive unit that operates an optical disk such as a CD-ROM (compact disc-read only memory), a DVD-ROM (digital versatile disc-read only memory), or a Blue-ray disc, or is a recording and reproducing unit for a magnetic recording medium, such as a hard disc drive. Alternatively, the storage unit 6 may be a card reader/writer that operates a memory card incorporating a solid-state memory as a recording medium, or may be a storage unit employing a solid-state memory.

A setting table to be described later is recorded in the recording medium 6a.

A position detector 7 is a unit for detecting the position of the reproducing device 1, and employs a global positioning system (GPS) so as to serve as a GPS positioning unit for example. As is publicly known, the GPS positioning unit receives radio waves transmitted from plural GPS satellites and calculates the position of a vehicle relative to a geostationary satellite, to thereby obtain the latitude and longitude as the position of the vehicle on a map.

The position detector 7 supplies an arithmetic processor 10 with information on the latitude and longitude as the vehicle position obtained through the positioning.

A communication unit 8 implements various kinds of communication with an external apparatus. The communication unit 8 may be a communication circuit for cellular phone communication or network communication, or may be a network interface for a local area network (LAN) or a wide area network (WAN) for example. Alternatively, the communication unit 8 may be a unit for wire communication such as universal serial bus (USB) or for wireless communication such as Bluetooth, or may be an off-line communication unit employing a memory medium such as a memory card.

Operation signals from the operation keys 5 and the optical receiver 4 shown also in FIG. 1 are supplied to the arithmetic processor 10.

The display 2 is driven by a display driver 21. The display driver 21 causes the display 2 to execute displaying of various kinds of video based on control by the arithmetic processor 10 and supplied data. The display 2 is caused to display thereon reproduced video of video content reproduced in the storage unit 6, and also display various images indicating an equalizer, operation conditions etc. during reproduction of audio content. In addition, the display 2 also displays a map image, a menu image and route information for navigation, and other various icons, operation menus, messages, setting screens etc.

An audio processor 22 processes audio data in accordance with control by the arithmetic processor 10, and causes the speaker 3 to output audio. For example, the audio processor 22 executes decoding, digital audio processing, D/A conversion, analog processing and amplification for audio signals of content data reproduced in the storage unit 6, and then causes the speaker 3 to output audio as reproduced content.

In addition, the audio processor 22 executes audio synthesis processing according to message information directed by the arithmetic processor 10 at the time of navigation operation for example, and outputs guide audio and message audio from the speaker 3.

The connector 24 is coupled to the connector 51 of the vehicle cradle 50 or the connector 61 of the home cradle 60, shown in FIGS. 1B and 1C.

A cradle interface 23 exchanges various kinds of data with an external device via the vehicle cradle 50 or the home cradle 60.

A power supply unit 9 supplies an operating supply voltage VDD to the respective components. The power supply unit 9 includes a battery 9a as a primary cell or secondary cell, and obtains the operating supply voltage VDD from the battery 9a when the reproducing device 1 is used alone as shown in FIG. 1A.

In contrast, when the connector 24 is coupled to the vehicle cradle 50 or the home cradle 60, the power supply unit 9 obtains the necessary supply voltage VDD from a voltage supplied from the cradle 50 or 60.

Switching on/off of supply of the voltage VDD from the power supply unit 9 to the respective components, i.e., powering on/off of the reproducing device 1 is controlled by the arithmetic processor 10.

The arithmetic processor 10 is a unit that implements main calculation and control for the reproducing device 1, and includes e.g. a central processing unit (CPU) 11, a read only memory (ROM) 12, a random access memory (RAM) 13, a non-volatile memory 14, and an interface 15.

Stored in the ROM 12 are operation programs, constants to be used for various kinds of processing, and fixed information. The operation programs may be stored in the recording medium 6a in the storage unit 6, and may be loaded in the arithmetic processor 10 at the time of operation.

The RAM 13 is used as a work area and a program load area, and is used for temporary storage of information.

The non-volatile memory 14 is a rewritable memory that can hold stored data even while voltage supply to the system is stopped. The non-volatile memory 14 is e.g. a static random access memory (SRAM), or flash memory, backed-up by a cell. Stored in the non-volatile memory 14 are coefficients to be used for various kinds of processing, navigation information registered by a user, specified route information, past-travel-history information, etc. In addition, a setting table to be described later may be stored in the non-volatile memory 14 instead of the recording medium 6a.

The CPU 11 executes information processing and control processing necessary for content reproduction operation and navigation operation based on a program stored in the ROM 12. For the information processing and control processing, the CPU 11 uses the RAM 13 as a work area and refers to information stored in the ROM 12 and the non-volatile memory 14.

The interface 15 is used for input/output of information between the arithmetic processor 10 and other respective components: the operating keys 5, the optical receiver 4, the display driver 21, the audio processor 22, the position detector 7, the storage unit 6, the cradle interface 23, the communication unit 8, and the power supply unit 9.

Specifically, the interface 15 transmits to the CPU 11, operation information and various kinds of input information from the operating keys 5 and the optical receiver 4, position information from the position detector 7, information input from an external device via the cradle interface 23, etc. Furthermore, the interface 15 supplies control information, image data and audio data output from the CPU 11 to the display driver 21 and the audio processor 22, so that video and audio arising from content reproduction and navigation operation are output. In some cases, control information, image data and audio data output from the CPU 11 are supplied to the cradle interface 23 so as to be transmitted to an external device coupled via the cradle 50 or 60.

The interface 15 transmits an access request from the CPU 11 to the storage unit 6, to thereby cause the storage unit 6 to execute requisite data reproduction and, in some cases, data recording. The interface 15 loads content data, map data etc. retrieved from the storage unit 6 in the arithmetic processor 10.

When various communications are carried out through the communication unit 8, the interface 15 is used for exchanges of communication control information and communication data between the arithmetic processor 10 and the communication unit 8.

Carried out via the cradle 50 or 60 coupled to the connector 24 and the cradle interface 23 is transmission of various signals between the reproducing device 1 and an external apparatus. Examples of the signals transmitted therebetween and components therebetween are as follows.

Power Supply Line

For example, a supply voltage feed line is established between the reproducing device 1 and an external apparatus, which allows an operating supply voltage to be obtained from the external apparatus or cradle. This operating supply voltage is provided to the power supply unit 9. In this case, the power supply unit 9 produces the operating supply voltage VDD by using the externally provided supply voltage. When the battery 9a is a secondary cell, the battery 9a may be charged by the externally provided supply voltage.

Position Detection Signal

Figure 4:
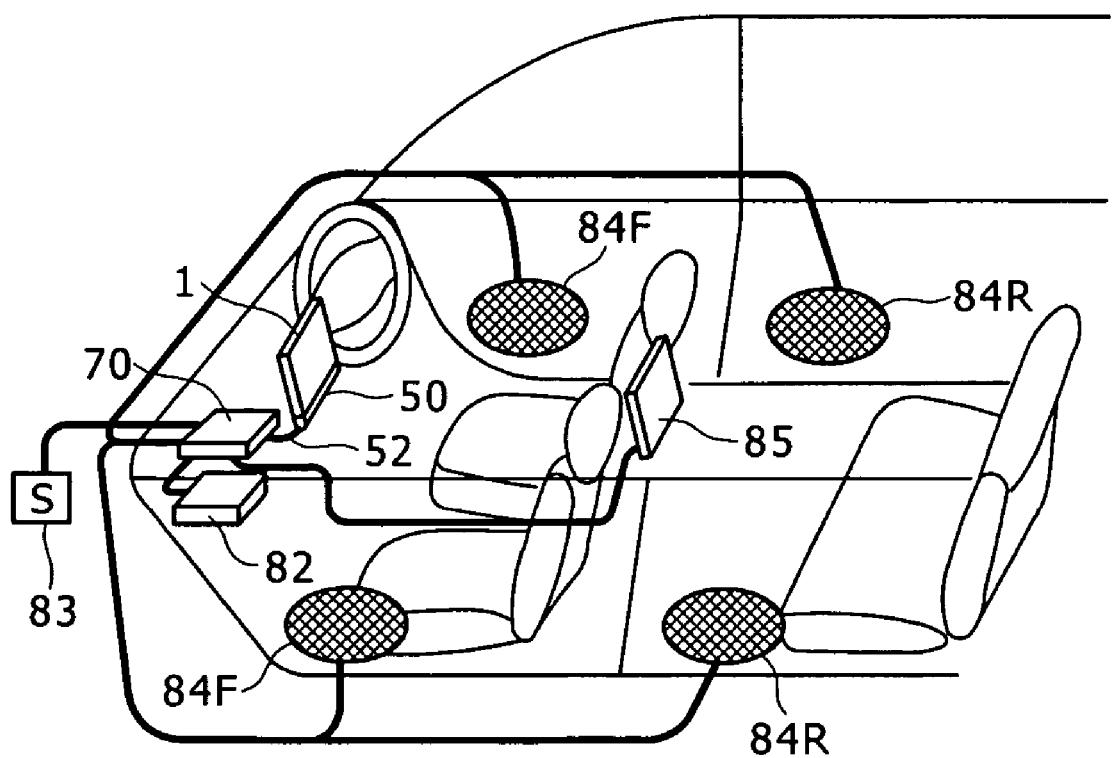
FIG. 4 is an explanatory diagram illustrating a vehicle AV system coupled to the reproducing device of the embodiment.

A position detection signal that includes information on latitude, longitude, etc. obtained by a GPS system is supplied from an external position detection device (e.g., a position detection device 82 in FIG. 4). In the present embodiment, since the reproducing device 1 incorporates the position detector 7, the device 1 itself is allowed to determine the self-position. In addition, when the reproducing device 1 is loaded in an automobile and is coupled to the vehicle cradle 50, a position detection signal from the position detection device (GPS unit) 82 mounted in the automobile is received through the cradle interface 23, followed by being supplied to the arithmetic processor 10. Thus, the present position of the automobile can be determined.

Sensor Signal

A sensor signal is a detection signal from an external sensor device (e.g., a sensor device 83 in FIG. 4). Specifically, the sensor signal is a detection signal from a velocity sensor and a gear position sensor provided in an automobile for example. This detected information on a vehicle is supplied via the cradle interface 23 to the arithmetic processor 10.

Audio Signal

An audio signal is a reproduced audio signal of audio content and video content reproduced in the storage unit 6. The arithmetic processor 10 supplies a reproduced audio signal to the cradle interface 23, and thus can supply the reproduced audio signal to an external device via the coupled cradle (50 or 60). In some cases, an audio signal of guide audio and the like produced due to a navigation function is supplied.

Video Signal

A video signal is a reproduced video signal of video content reproduced in the storage unit 6. The arithmetic processor 10 supplies a reproduced video signal to the cradle interface 23, and thus can supply the reproduced video signal to an external device via the coupled cradle (50 or 60). In some cases, a video signal of a map image and the like produced due to a navigation function is supplied.

Operation Input Signal

An operation input signal is supplied from an external device. Specifically, an external device transfers an operation input signal to the reproducing device 1 according to operation input by a user to the external device. This operation input signal is supplied via the cradle interface 23 to the arithmetic processor 10.

Control Signal

A control signal is a signal output from the arithmetic processor 10 to an external device. When the arithmetic processor 10 supplies a reproduced audio signal and a reproduced video signal of content to an external device, the arithmetic processor 10 also supplies a control signal regarding the reproduction output of the content.

Cradle Determination Signal

A cradle determination signal is a signal for determining the cradle coupled to the reproducing device 1, or for determining whether the reproducing device 1 is not coupled to any cradle (hereinafter, referred to as a non-coupled state). For example, assigning different terminal levels (H, L) to the respective specific terminals of the vehicle and home cradles 50 and 60 allows the reproducing device 1 to determine which of the cradles 50 and 60 the reproducing device 1 is coupled to, or determine whether the reproducing device 1 is in the non-coupled state.

Note that the kinds of signals shown in FIG. 2 to be transmitted via the cradle interface 23 are merely an example, and the kinds of signals often depend on the types of the vehicle cradle 50 and the home cradle 60. In the present embodiment, the cradles 50 and 60 and the connectors 24, 51 and 61 are provided with the requisite number of terminals for the transmission of these signals.

Figure 3A:
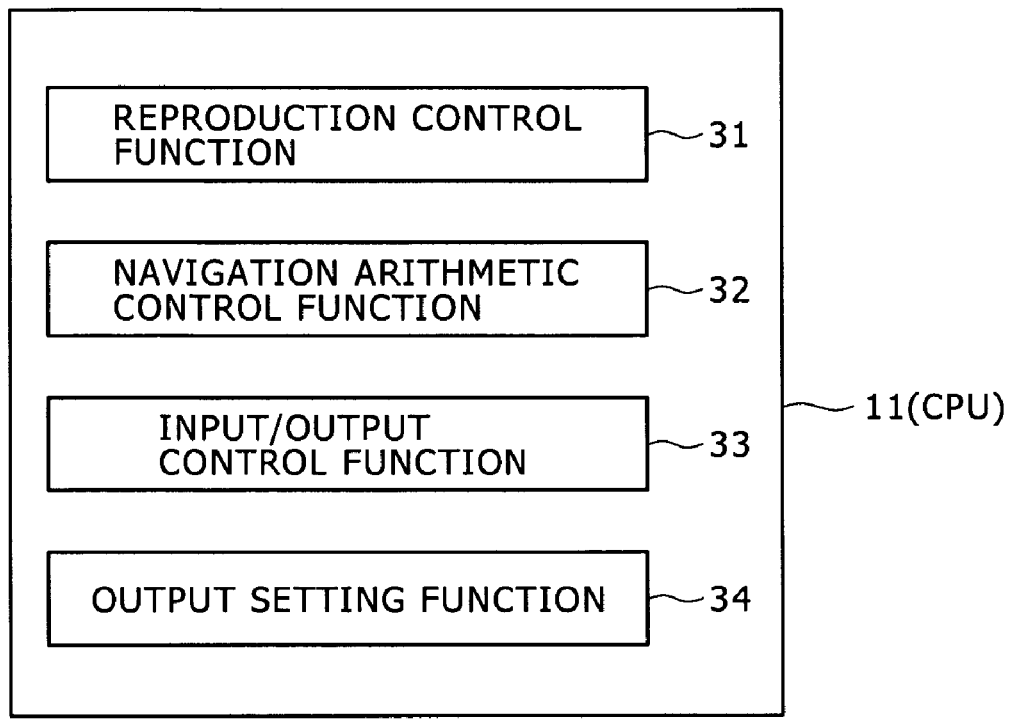
FIGS. 3A and 3B are explanatory diagrams of the functions of a CPU and stored data in the reproducing device of the embodiment.

FIG. 3A shows functions that are provided for the CPU 11 for the operation of the reproducing device 1 of the present embodiment, i.e., functions implemented by arithmetic processing based on programs stored in the ROM 12 and the like.

As the functions of the CPU 11, a reproduction control function 31, a navigation arithmetic control function 32, an input/output control function 33, and an output setting function 34 are provided. These functions may be implemented by individual program modules separately, or alternatively programs for executing plural functions may be mixed in one program.

The reproduction control function 31 is to control the reproduction of content such as video content and music content. Specifically, in response to operation by a user, the reproduction control function 31 implements control processing of controlling the storage unit 6 so that the storage unit 6 executes reproduction of content data recorded in the recording medium 6a.

The reproduction control function 31 then executes requisite processing for the content data reproduced in the storage unit 6 and loaded in the arithmetic processor 10, so that video data is supplied to the display driver 21 and audio data is supplied to the audio processor 22. It is also possible that the video data and audio data are supplied to the cradle interface 23 and thus are supplied to an external device via the cradle 50 or 60.

The supply destination of the video data and audio data is controlled by the input/output control function 33.

The navigation arithmetic control function 32 executes processing necessary for navigation operation. Examples of the processing are as follows: registration processing for destinations and relay points of a user; route search processing; retrieval processing for map data, POI data, etc. from the storage unit 6; drawing processing for navigation images such as map images; determination processing relating to a self-position and a vehicle position based on information from a position detector and a sensor (the position detection device 82 and the sensor device 83 in FIG. 4 to be described later) provided in a vehicle; guide indication processing associated with travel of a vehicle; and output control processing for guide audio, etc.

When being used in an automobile with being coupled to the vehicle cradle 50, the reproducing device 1 obtains signals from the position detection device 82 and the sensor device 83 provided in the automobile, or a signal from the position detector 7, and thus can determine the position of the automobile. In addition, since the reproducing device 1 includes the position detector 7, the reproducing device 1 can determine the self-position also when being used alone, which allows the reproducing device 1 to serve also as a portable navigation device.

The input/output control function 33 determines the device environmental condition of the reproducing device 1, and associates the determination result with a setting table to thereby decide and control an output part and details of control. The setting table is recorded in the recording medium 6a in the storage unit 6 for example.

In the present embodiment, the input/output control function 33 determines the coupling state of the reproducing device 1 and the state of a vehicle, to thereby discriminate the following four device environmental conditions: the state where the reproducing device 1 is not coupled to any cradle, i.e., the device 1 is used alone; the state where the reproducing device 1 is coupled to the home cradle 60; the state where the reproducing device 1 is coupled to the vehicle cradle 50 and the vehicle is in the stopped state; and the state where the reproducing device 1 is coupled to the vehicle cradle 50 and the vehicle is running.

Output part information and control information are registered in a setting table with being associated with these device environmental conditions.

Figure 3B:
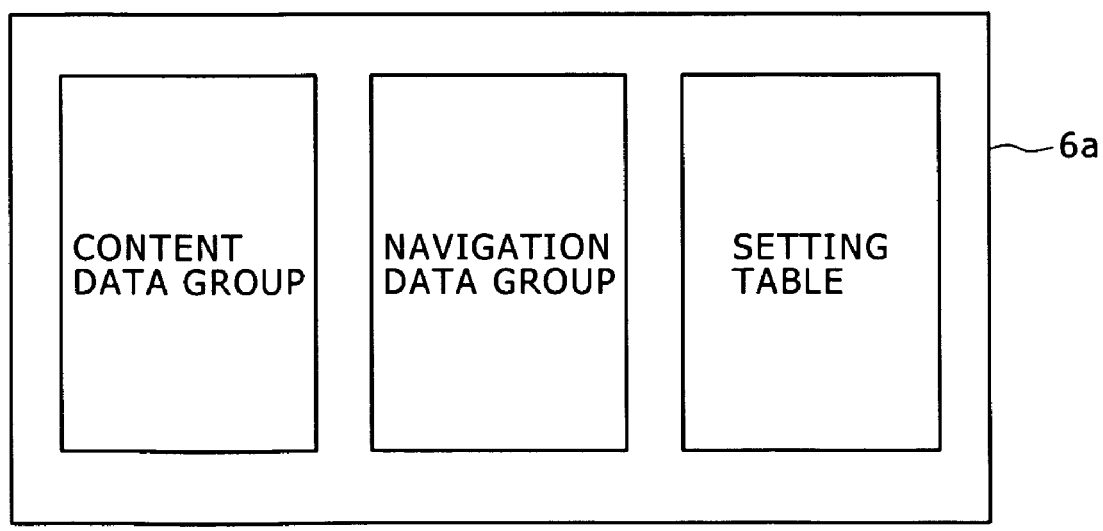

FIG. 3b schematically shows data recorded in the recording medium 6a in the storage unit 6. Recorded in the recording medium 6a are a group of audio and video content data, a group of navigation data typified by map data and POI data used for navigation operation, and a setting table. A specific example of the contents of this setting table will be described later for FIG. 8. The input/output control function 33 retrieves from the setting table, output part information and control information corresponding to the determined device environmental condition, and executes processing in accordance with the retrieved information. Specifically, the input/output control function 33 notifies the reproduction control function 31 of the supply destination of content data according to the output part information. Furthermore, the input/output control function 33 controls the reproducing device 1 or transmits the control information to an external device according to the control information.

In addition, when the reproducing device 1 is coupled to the cradle 50 or 60, the input/output control function 33 also implements processing of accepting operation input from an external device. When the reproducing device 1 receives via the cradle interface 23 operation input executed by a user to an external device, the input/output control function 33 supports the reproduction control function according to the operation input, so that operation for content reproduction is carried out according to the user's operation.

The output setting function 34 is a function that executes edit processing for a setting table.

Although it is preferable that output part information and control information regarded as being adequate are registered in the setting table as default information, the optimal setting condition frequently differs depending on a system and equipment owned by an individual user, use environments, user's preferences, etc. Therefore, the output setting function 34 is provided to allow a user to optionally edit and change the contents registered in the setting table. The output setting function 34 implements control of displaying of an operation screen and detection of input, for the editing of a setting table. Furthermore, the output setting function 34 updates the setting table according to user's operation.

As described above, in the configuration of FIG. 3B, a setting table is recorded in the recording medium 6a. This configuration is adequate for the case where the recording medium 6a is a hard disk or a solid-state memory that is not removable from the reproducing device 1. In this case, the output setting function 34 controls the storage unit 6 so that the storage unit 6 executes rewriting of a setting table in the recording medium 6a.

Even when the recording medium 6a as a hard disk or a solid-state memory is used, a setting table may be held in the non-volatile memory 14. In contrast, when the storage unit 6 is a reproduction unit for a removable medium such as a CD-ROM or a DVD-ROM, it is inadequate for a setting table to be registered in the recording medium 6a. Therefore, the setting table needs to be held in the non-volatile memory 14. In this case, the output setting function 34 executes update processing for a setting table held in the non-volatile memory 14.

In the configuration example of the reproducing device 1 of the embodiment described with FIGS. 1A to 1C, 2, 3A and 3B, the storage unit 6 for reproducing content data corresponds to a reproducer set forth in claims of the invention. Furthermore, the CPU 11 having the navigation arithmetic control function 32 that produces video and audio for navigation also corresponds to the reproducer.

The display 2, the display driver 21, the speaker 3 and the audio processor 22 correspond to a main-body output unit set forth in claims of the invention.

The cradle interface 23 and the connector 24 correspond to an external output unit set forth in claims of the invention.

The recording medium 6a and the non-volatile memory 14 correspond to a storage set forth in claims of the invention.

The CPU 11 having the input/output control function 33 corresponds to a controller set forth in claims of the invention.

The CPU 11 having the output setting function 34 corresponds to a setting changer set forth in claims of the invention.

2. Example of Coupling with Vehicle AV System

A coupling configuration example when the reproducing device 1 of the present embodiment is coupled to a vehicle AV system via the vehicle cradle 50 will be described with reference to FIGS. 4 and 5.

FIG. 4 illustrates an arrangement example in a car. When being loaded in a car, the reproducing device 1 is used near the driver seat for example. Therefore, the vehicle cradle 50 is attached near the driver seat, and a user mounts the reproducing device 1 to the vehicle cradle 50 as shown in the drawing.

In the illustrated example, the vehicle cradle 50 is coupled to a car AV amplifier 70 via the cable 52. Thus, transmission of the above-described various kinds of signals is implemented between the reproducing device 1 and the car AV amplifier 70 via the vehicle cradle 50.

In the car, a display 85 is placed to face rear seats. This display 85 is coupled to the car AV amplifier 70 and displays video based on a video signal supplied from the car AV amplifier 70.

In addition, the car is provided with two front speakers 84F and two rear speakers 84R. Each of the speakers 84F and 84R outputs audio based on an audio signal supplied from the car AV amplifier 70.

Furthermore, the position detection device 82 as e.g. a GPS unit is provided in the car. Position detection information by this position detection device 82 is supplied to the car AV amplifier 70. The car AV amplifier 70 can supply the position detection information to the reproducing device 1 via the vehicle cradle 50.

The car is also provided with the sensor device 83. The sensor device 83 is a unit for detecting the travel conditions, behaviors, etc. of the car. A detection signal of the sensor device 83 is supplied to the car AV amplifier 70. The car AV amplifier 70 can supply the detection signal to the reproducing device 1 via the vehicle cradle 50.

Although FIG. 4 illustrates only one sensor device 83, a plurality of sensor devices 83 may be provided as a unit system for detecting various kinds of behaviors of the car.

Possible examples of the kinds of the sensor device 83 are as follows: a gear position sensor; a vehicle velocity sensor that detects a wheel rotation speed; a vibrating gyro sensor that detects the rotation angular velocity of a car body; an acceleration sensor that detect the acceleration of a car; a vibration sensor for detecting the vibration of a car; a parking brake switch; a brake lamp switch; a steering angle sensor; and a throttle opening sensor.

The arithmetic processor 10 in the reproducing device 1 can determine the behavior conditions of a car by using the detection signals from the various kinds of the sensor devices 83. In addition, if the arithmetic processor 10 uses not only position information from the position detection device 82 (or the position detector 7) but also detection signals from the sensor device 83, the vehicle position can be detected more accurately.

The respective units in this car AV system are provided with a DC supply voltage from a car battery although not shown in FIG. 4.

Figure 5:
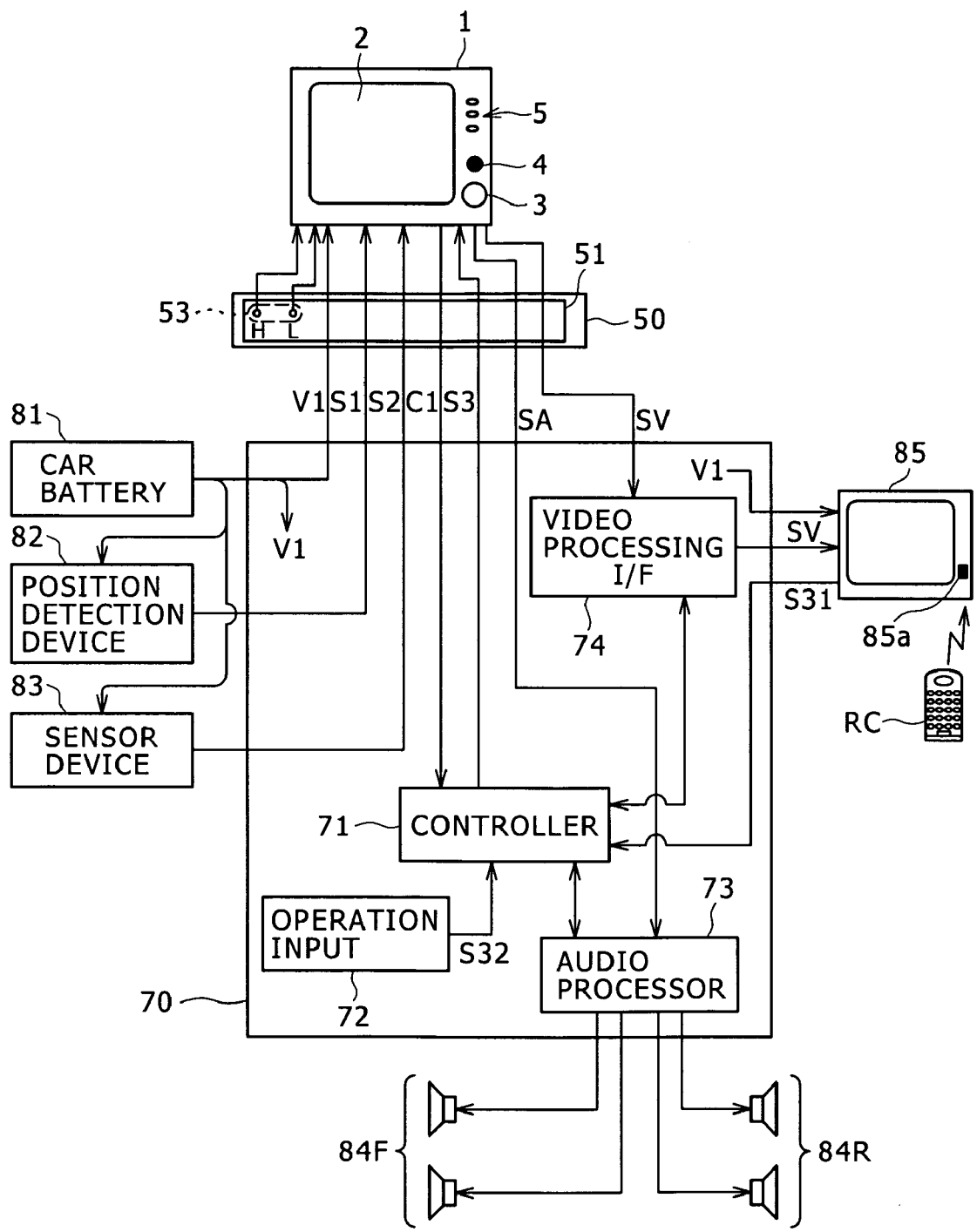
FIG. 5 is an explanatory diagram of signal transmission when the reproducing device of the embodiment is coupled to a vehicle AV system.

FIG. 5 shows the coupling configuration pertaining to signal transmission between the reproducing device 1 and the car AV system of the example in FIG. 4. For the car AV amplifier 70, FIG. 5 illustrates only part relating to signal transmission with the reproducing device 1.

A DC supply voltage V1 by a car battery 81 is applied to the car AV amplifier 70, the position detection device 82, and the sensor device 83. In addition, the DC supply voltage V1 is supplied from the car AV amplifier 70 via the vehicle cradle 50 to the reproducing device 1. The DC supply voltage V1 is also supplied from the car AV amplifier 70 to the display 85.

In the connector 51 of the vehicle cradle 50, two specific terminals serve as coupling determination terminals 53. The terminal voltage of one of the coupling determination terminals 53 is set to the H level, while the voltage of the other is set to the L level, for example. These terminal voltages can be produced from the DC supply voltage V1.

The reproducing device 1 detects that the two coupling determination terminals 53 are at the H and L levels, respectively, and thus can determine that the reproducing device 1 is coupled to the vehicle cradle 50.

Position detection information S1, i.e., latitude/longitude information and the like from the position detection device 82 are supplied to the reproducing device 1 via the car AV amplifier 70 and the vehicle cradle 50.

A detection signal S2 of various kinds of vehicle information from the sensor device 83 is also supplied to the reproducing device 1 via the car AV amplifier 70 and the vehicle cradle 50.

The car AV amplifier 70 includes a controller 71, an operation input unit 72, a video processing and interface unit 74, and an audio processor 73.

The controller 71 controls the operation of the car AV amplifier 70.

The operation input unit 72 is formed of e.g. operating keys provided on the casing of the car AV amplifier 70.

The video processing and interface unit 74 implements various kinds of requisite video processing for a video signal, and supplies a video signal SV to the display 85 so that the display 85 executes video output.

The audio processor 73 executes processing such as equalizing, volume adjustment and output amplification for an audio signal, and supplies the processed signal to the speakers 84F and 84R so that the speakers 84F and 84R output audio.

The reproducing device 1 can transmit a control signal C1 to the controller 71 in the car AV amplifier 70 via the vehicle cradle 50. The controller 71 controls the processing operation of the audio processor 73 and the video processing and interface unit 74 based on the control information transmitted from the reproducing device 1.

The reproducing device 1 can transmit an audio signal SA of reproduced content to the audio processor 73 in the car AV amplifier 70 via the vehicle cradle 50. The audio processor 73 executes processing such as equalizing, volume adjustment and output amplification for the supplied audio signal SA, and then supplies the processed signal to the speakers 84F and 84R. Thus, a reproduced audio signal of content reproduced in the reproducing device 1 can be output from the speakers 84F and 84R in the car.

The reproducing device 1 can transmit a video signal SV of reproduced content to the video processing and interface unit 74 in the car AV amplifier 70 via the vehicle cradle 50. The video processing and interface unit 74 executes requisite video processing for the supplied video signal SV, and supplies the processed signal to the display 85. Thus, a reproduced video signal of content reproduced in the reproducing device 1 can be output by use of the display 85 in the car.

The video signal SV and the audio signal SA output from the reproducing device 1 encompass not only video and audio signals of content reproduced in the storage unit 6 but also navigation images, guide audio, etc. produced by the navigation function of the arithmetic processor 10.

The display 85 is provided with an optical receiver 85a for an infrared operation signal, and thus can receive an operation signal from a remote commander RC. For example, a person sitting at a rear seat in the car can achieve desired operation by operating the remote commander RC with directing it toward the display 85.

An operation signal S31 received by the display 85 is supplied to the controller 71 in the car AV amplifier 70. An operation signal S32 from the operation input unit 72 is also supplied to the controller 71.

The controller 71 can implement requisite control in response to the reception of the operation signals S31 and S32. When the reproducing device 1 is coupled to the car AV amplifier 70, the controller 71 transfers to the reproducing device 1 the operation information S31 and S32 as an operation signal S3. The arithmetic processor 10 in the reproducing device 1 controls the device operation depending upon the operation signal S3.

When content reproduced in the reproducing device 1 is output and displayed by the display 85, a user can implement, for the display 85, operation relating to reproduction such as stop, pause, fast-forwarding, fast-rewinding, and cueing with use of the remote commander RC. The operation signal S31 arising from this operation is sent from the controller 71 to the arithmetic processor 10 in the reproducing device 1 as the operation signal S3. Depending on details of the operation, the arithmetic processor 10 controls conditions of reproduction operation in the storage unit 6 and conditions of outputting of the reproduced audio signal SA and the reproduced video signal SV. Thus, a user watching the display 85 can implement requisite operation without paying attention to the reproducing device 1, which executes the actual reproduction.

Due to the above-described signal transmission between the reproducing device 1 and the car AV system, video and audio produced by the reproducing function and the navigation function of the reproducing device 1 can be output by use of the car AV system.

3. Example of Coupling with Home AV System

A coupling configuration example when the reproducing device 1 of the present embodiment is coupled to a home AV system via the home cradle 60 will be described with reference to FIGS. 6 and 7.

Figure 6:
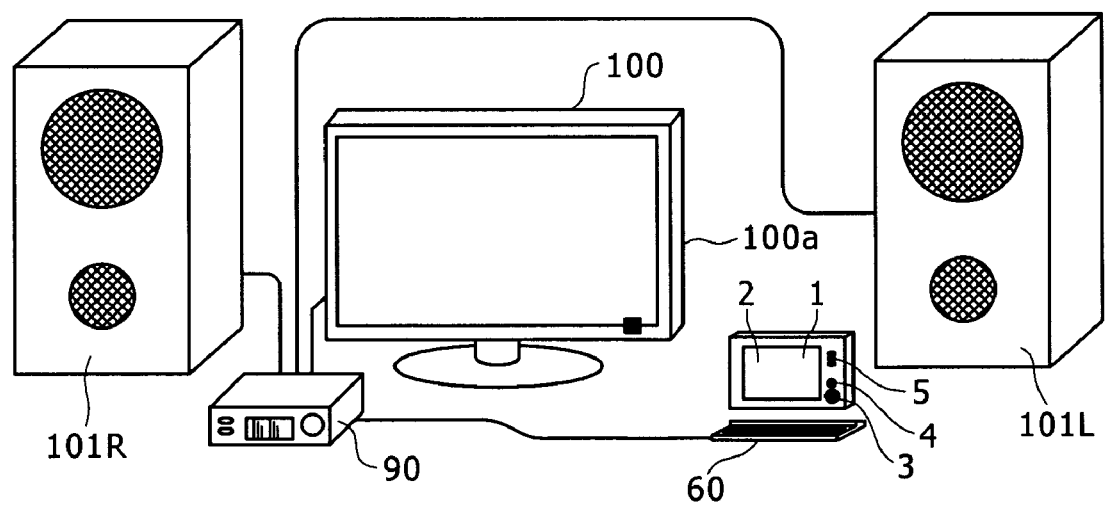
FIG. 6 is an explanatory diagram illustrating a home AV system coupled to the reproducing device of the embodiment.

FIG. 6 illustrates an arrangement example of the home AV system. The home AV system includes the home cradle 60 for coupling to the reproducing device 1, and a user mounts the reproducing device 1 to the home cradle 60 in a home or the like as shown in the drawing.

In the illustrated example, the home cradle 60 is coupled to a home AV amplifier 90 via the cable 62. Thus, transmission of the above-described various kinds of signals is implemented between the reproducing device 1 and the home AV amplifier 90 via the home cradle 60.

As a video output unit in the home AV system, e.g. a display 100 with a comparatively large size is employed. This display 100 is coupled to the home AV amplifier 90 and displays video based on a video signal supplied from the home AV amplifier 90.

In addition, left and right two speakers 101L and 101R are coupled to the home AV amplifier 90, so that the speakers 101L and 101R output audio based on an audio signal supplied from the home AV amplifier 90.

Figure 7:
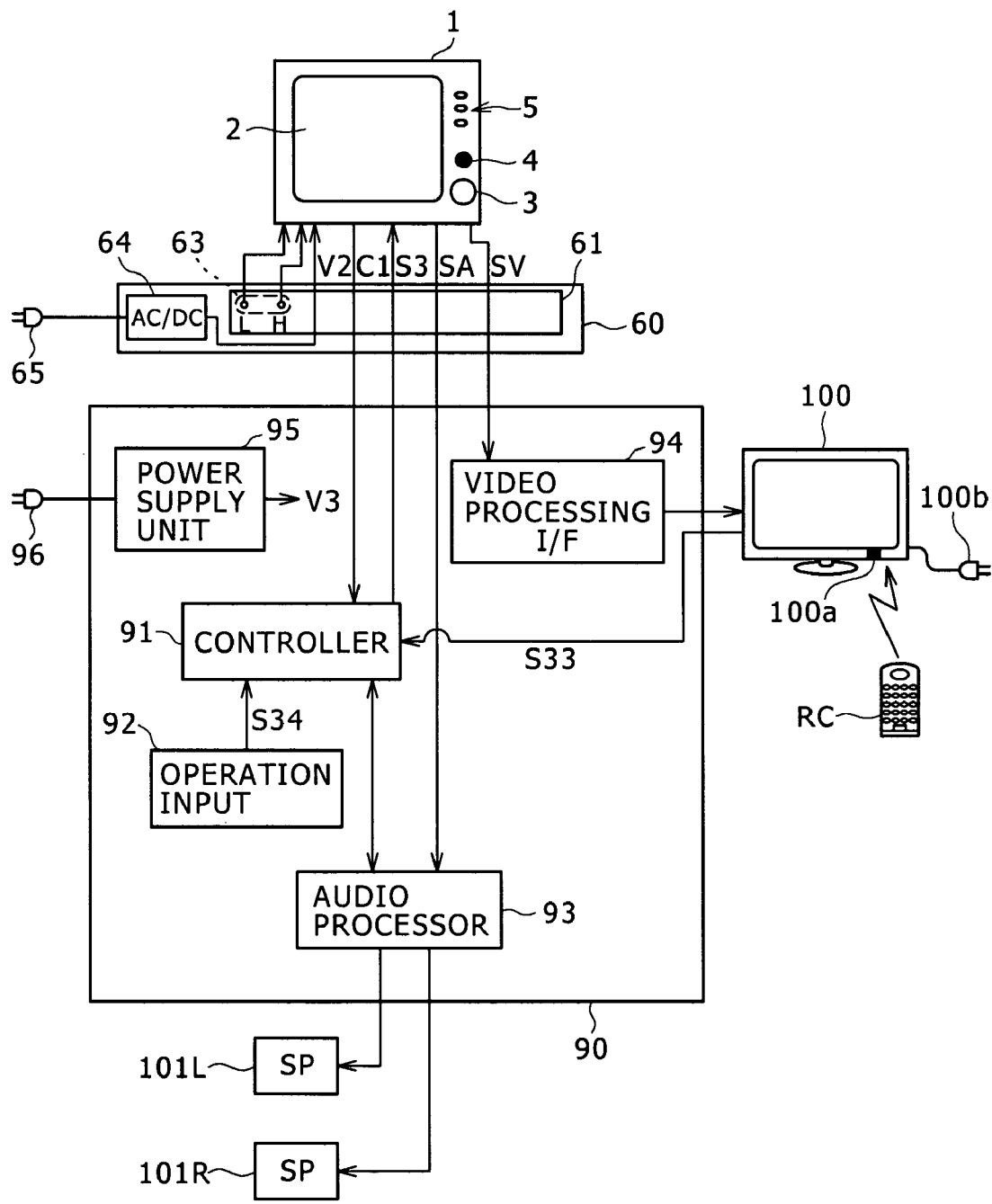
FIG. 7 is an explanatory diagram of signal transmission when the reproducing device of the embodiment is coupled to a home AV system.

FIG. 7 shows the coupling configuration pertaining to signal transmission between the reproducing device 1 and the home AV system of the example in FIG. 6. For the home AV amplifier 90, FIG. 7 illustrates only part relating to signal transmission with the reproducing device 1.

In this example, the home cradle 60, the home AV amplifier 90 and the display 100 obtain operating voltages from a home AC power supply.

The home cradle 60 is coupled via a power outlet plug 65 to the home AC power supply. An AC/DC converter 64 produces from an AC supply voltage a DC supply voltage V2 necessary for the reproducing device 1, so that this supply voltage V2 is supplied to the reproducing device 1.

The home AV amplifier 90 is coupled via a power outlet plug 96 to the home AC power supply. An AC/DC converter in a power supply unit 95 produces from an AC supply voltage a DC supply voltage V3 necessary for the home AV amplifier 90.

The display 100 is also coupled to the home AC power supply via a power outlet plug 100b, and a power supply unit (not shown) therein produces a necessary operating supply voltage.

In the connector 61 of the home cradle 60, two specific terminals serve as coupling determination terminals 63. The terminal voltage of one of the coupling determination terminals 63 is set to the L level, while the voltage of the other is set to the H level, for example. These terminal voltages can be produced from the DC supply voltage V2.

The coupling determination terminals 63 are located on the same positions, relative to the reproducing device 1, as those of the coupling determination terminals 53 of the vehicle cradle 50. However, the two coupling determination terminals 53 of the vehicle cradle 50 are set to the H and L levels, respectively, in that order from the cradle end, while the two coupling determination terminals 63 of the home cradle 60 are set to vice versa L and H, respectively. This reverse level assignment allows the reproducing device 1 to determine the kind of the coupled cradle.

In the example of FIG. 7, the reproducing device 1 detects that the two coupling determination terminals 63 are at the L and H levels, respectively, and thus can determine that the reproducing device 1 is coupled to the home cradle 60.

When two terminals in each cradle are used as the coupling determination terminals 53 and 63, four kinds of coupling states can be determined depending on the H/L levels of the respective terminals. Specifically, if combinations of two terminal levels (L, L), (H, L), (L, H) and (H, H) are assigned to the respective cradles in advance, the determination of up to four kinds of cradles is allowed.

Therefore, even when the above-described vehicle system also includes a rear-seat cradle for example, discrimination between the rear-seat cradle and the front-seat cradle is also possible.

It is obvious that, for more kinds of cradles, three or more terminals may be used as coupling determination terminals in each cradle.

In the present embodiment, the reproducing device 1 detects three coupling states: the state of being coupled to the vehicle cradle 50, the state of being coupled to the home cradle 60, and the non-coupled state. That is, two kinds of cradles are determined. In this case, even one coupling determination terminal in each cradle enables the determination. For example, the following setting is possible: the H level of the terminal corresponds to the vehicle cradle 50, the L level to the home cradle 60, and the high-impedance state to the non-coupled state.

The home AV amplifier 90 includes a controller 91, an operation input unit 92, a video processing and interface unit 94, and an audio processor 93.

The controller 91 controls the operation of the home AV amplifier 90.

The operation input unit 92 is formed of e.g. operating keys provided on the casing of the home AV amplifier 90.

The video processing and interface unit 94 implements various kinds of requisite video processing for a video signal, and supplies a video signal SV to the display 100 so that the display 100 executes video output.

The audio processor 93 executes processing such as equalizing, volume adjustment and output amplification for an audio signal, and supplies the processed signal to the speakers 101L and 101R so that the speakers 101L and 101R output audio.

The reproducing device 1 can transmit a control signal C1 to the controller 91 in the home AV amplifier 90 via the home cradle 60. The controller 91 controls the processing operation of the audio processor 93 and the video processing and interface unit 94 based on the control information transmitted from the reproducing device 1.

The reproducing device 1 can transmit an audio signal SA of reproduced content to the audio processor 93 in the home AV amplifier 90 via the home cradle 60. The audio processor 93 executes processing such as equalizing, volume adjustment and output amplification for the supplied audio signal SA, and then supplies the processed signal to the speakers 101L and 101R. Thus, a reproduced audio signal of content reproduced in the reproducing device 1 can be output from the speakers 101L and 101R provided in a home or the like.

The reproducing device 1 can transmit a video signal SV of reproduced content to the video processing and interface unit 94 in the home AV amplifier 90 via the home cradle 60. The video processing and interface unit 94 executes requisite video processing for the supplied video signal SV, and supplies the processed signal to the display 100. Thus, a reproduced video signal of content reproduced in the reproducing device 1 can be output by use of e.g. the large-size display 100 provided in a home or the like.

The display 100 is provided with an optical receiver 100*a* for an infrared operation signal, and thus can receive an operation signal from a remote commander RC. When using the home AV system, a user operates the remote commander RC with directing it toward the display 100, and thus can achieve desired operation.

An operation signal S33 received by the display 100 is supplied to the controller 91 in the home AV amplifier 90. An operation signal S34 from the operation input unit 92 is also supplied to the controller 91.

The controller 91 can implement requisite control in response to the reception of the operation signals S33 and S34. When the reproducing device 1 is coupled to the home AV amplifier 90, the controller 91 transfers to the reproducing device 1 the operation information S33 and S34 as an operation signal S3. The arithmetic processor 10 in the reproducing device 1 controls the device operation depending upon the operation signal S3.

When content reproduced in the reproducing device 1 is output and displayed by the display 100, and a user implements, for the display 100, operation relating to reproduction such as stop, pause, fast-forwarding, fast-rewinding, and cueing with use of the remote commander RC, the operation signal S33 corresponding to the user's operation is transmitted from the controller 91 to the arithmetic processor 10 in the reproducing device 1 as the operation signal S3. Depending on details of the operation, the arithmetic processor 10 controls conditions of reproduction operation in the storage unit 6 and conditions of outputting of the reproduced audio signal SA and the reproduced video signal SV. Thus, a user watching the display 100 can implement requisite operation without paying attention to the reproducing device 1, which executes the actual reproduction.

Due to the above-described signal transmission between the reproducing device 1 and the home AV system, video and audio produced by the reproducing function of the reproducing device 1 can be output by use of the home AV system. Furthermore, it is also possible to watch map images and the like produced by the navigation function of the reproducing device 1 by use of the home AV system.

4. Setting Table

A specific example of a setting table in the reproducing device 1 of the present embodiment will be described below.

Figures 8A, 8B:
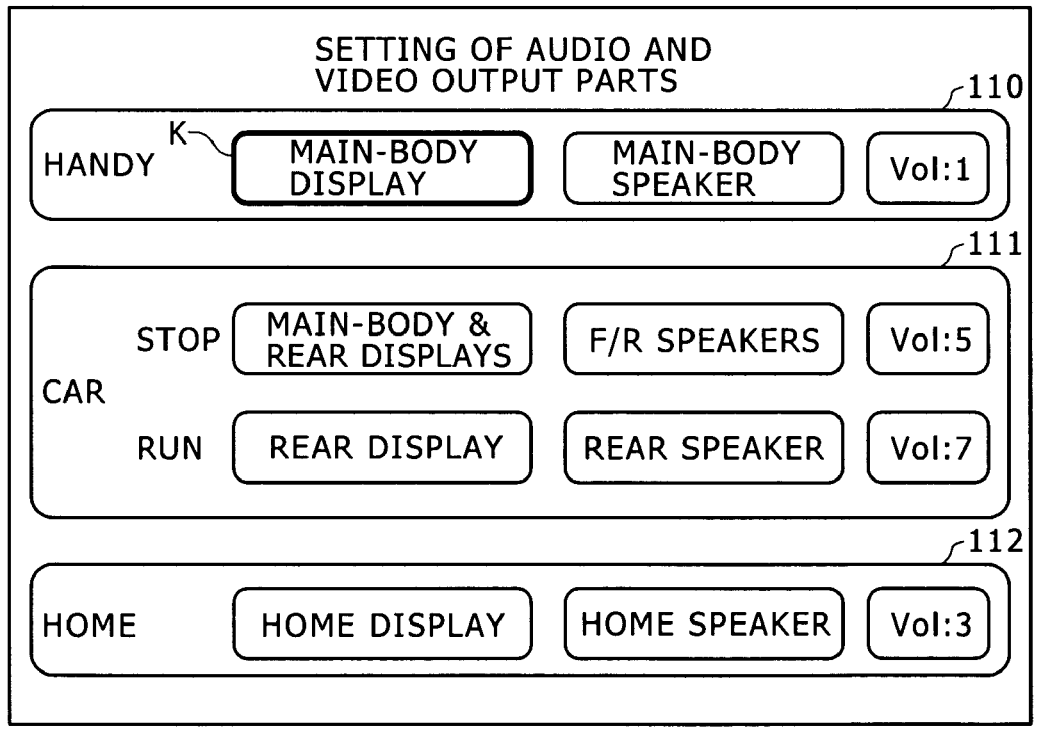
FIGS. 8A and 8B are explanatory diagrams relating to a setting table according to the embodiment.

A setting table stored in the recording medium 6*a* in the storage unit 6 (or in the non-volatile memory 14) includes information like that of shown in FIG. 8A.

As described above, registered in the setting table are output part information and control information that are associated with various kinds of device environmental conditions. In the example of FIG. 8A, the device environmental conditions are classified into four conditions: HANDY, CAR/STOP, CAR/RUN, and HOME.

The condition HANDY corresponds to the state where the reproducing device 1 is used alone.

The condition CAR/STOP corresponds to the state where the reproducing device 1 is coupled to a vehicle AV system via the vehicle cradle 50 and the car is in the stopped state.

The condition CAR/RUN corresponds to the state where the reproducing device 1 is coupled to a vehicle AV system via the vehicle cradle 50 and the car is running.

The condition HOME corresponds to the state where the reproducing device 1 is coupled to a home AV system via the home cradle 60.

In association with these device environmental conditions, output part information and control information are registered in the setting table. Registered as the output part information are video output parts and audio output parts. As for the control information, information on volume levels at the time of outputting audio is registered.

When the device environmental condition is HANDY, the video output part is set to a main-body display. That is, the display 2 is registered as the video output part. The audio output part is set to a main-body speaker. That is, the speaker 3 is registered as the audio output part. The volume level is set to 1. This volume level corresponds to control information for volume adjustment by the audio processor 22.

When the device environmental condition is CAR/STOP, the video output part is set to the main-body display and a rear display. That is, both the display 2 and the display 85 in a vehicle AV system are registered as the video output part. The audio output part is set to F/R speakers. That is, the front speakers 84F and the rear speakers 84R in the vehicle AV system are registered as the audio output part. The volume level is set to 5. This volume level corresponds to control information for volume adjustment by the audio processor 73 in the car AV amplifier 70.

When the device environmental condition is CAR/RUN, the video output part is set to the rear display. That is, the display 85 in the vehicle AV system is registered as the video output part. The audio output part is set to the rear speaker. That is, the rear speakers 84R in the vehicle AV system are registered as the audio output part. The volume level is set to 7. This volume level corresponds to control information for volume adjustment by the audio processor 73 in the car AV amplifier 70.

When the device environmental condition is HOME, the video output part is set to a home display. That is, the display 100 in a home AV system is registered as the video output part. The audio output part is set to a home speaker. That is, the L/R speakers 101L and 101R in the home AV system are registered as the audio output part. The volume level is set to 3. This volume level corresponds to control information for volume adjustment by the audio processor 93 in the home AV amplifier 90.

Although the output part information is separated from the control information for description convenience, the output part information is one kind of the control information. In some cases, the control information C1 in FIG. 5 from the reproducing device 1 to the controller 71 and the control information C1 in FIG. 7 from the reproducing device 1 to the controller 91 include not only information on volume levels in FIG. 8A but also information on video output parts and audio output parts as one kind of control information.

The registration contents in this setting table can be changed by a user. Specifically, even if the setting table includes the registered information shown in FIG. 8A as default information, a user can change the registered information from the default information according to circumstances of AV systems owned by the user and preferences of the user.

The CPU 11 in the reproducing device 1 allows the updating of the setting table by a user and the rewriting of the setting table according to the update operation, by use of the output setting function 34 described with FIG. 3A.

When a user has executed operation for directing the editing of the setting table, the output setting function 34 displays an image for editing the setting table like one in FIG. 8B on the display 2.

In this image of FIG. 8B, the registered information in FIG. 8A is displayed on setting windows 110, 111 and 112. On this screen, a user can select specific registered information by use of a cursor K (or highlight display etc.) and input a change to the selected information, through operation with use of the operating keys 5, the remote commander, and other devices. Specifically, as user-interface processing, the output setting function 34 moves the cursor K on the screen in response to the cursor operation by the user, and sequentially switches the candidates of information to be registered in response to the information change operation. For example, as the information to be registered for the video output part, selection from the following is allowed: main-body display, main-body & rear displays, main-body & front displays, rear display, front display, home display, and main-body & home displays.

In addition, as the control information, changing of the volume level with a certain increment in the level range of e.g. 0 to 10 is allowed.

When a user has carried out desired information change operation and decision operation on the screen, the output setting function 34 rewrites the setting table recorded in the recording medium 6a in the storage unit 6 or the non-volatile memory 14 in accordance with the operation.

5. Output Control Processing

Figure 9:
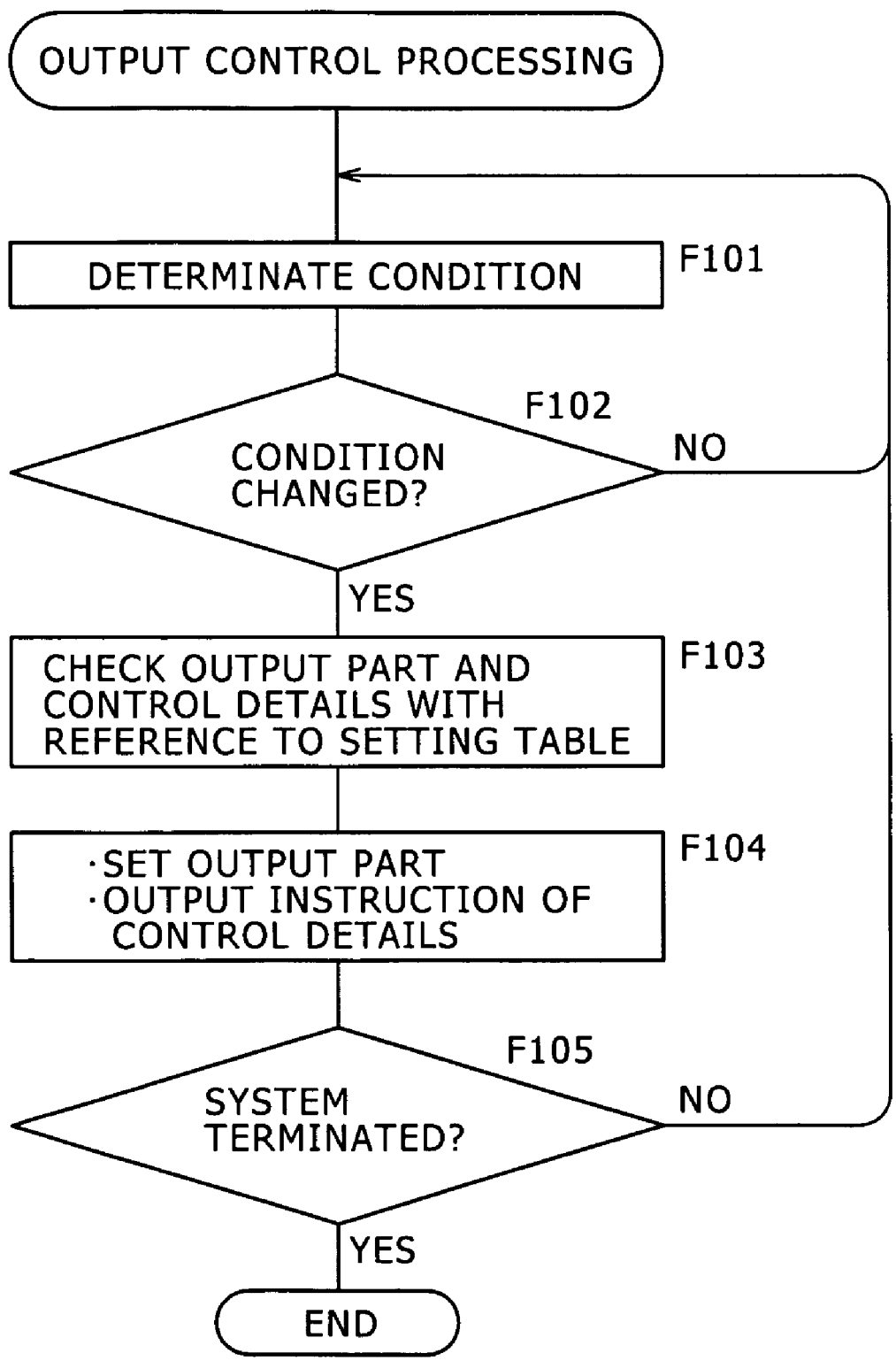
FIG. 9 is a flowchart of output control processing of the embodiment.

In reproduction of content or the like, the CPU 11 in the reproducing device 1 implements output control in accordance with the registered contents in the setting table by use of the input/output control function 33. FIG. 9 shows an example of the output control processing. This processing is continuously carried out while the reproducing device 1 is powered up for example.

In a step F101, the CPU 11 determines a device environmental condition. Specifically, the CPU 11 determines which of the vehicle cradle 50 and the home cradle 60 the reproducing device 1 is couple to, or determines the non-coupled state thereof. As described above, checking the levels of the coupling determination terminals 53 and 63 allows this determination as to the coupling state.

When the reproducing device 1 is coupled to the vehicle cradle 50 in particular, based on the detection signal S2 supplied from the sensor device 83 of FIG. 5 as information on the vehicle, the CPU 11 also determines whether the vehicle is running or in the stopped state. For this determination as to the stopped state or running state, vehicle velocity information may be detected. Alternatively, if the state where the vehicle is temporarily stationary because of e.g. a red traffic light is also regarded as the running state, and the stopped state is defined as the state where the vehicle is not being driven but completely stopped and parked, gear-position information may be checked so that the CPU 11 determines that the vehicle is in the stopped state when the gear position is at the parking position.

The CPU 11 detects the cradle-coupling state and the motion state of a vehicle as described above, and thus can determine which of four device environmental conditions in the setting table of FIG. 8A the current state corresponds to.

If, in a step F102, it is determined that the device environmental condition has changed as a result of the determination of the device environmental condition in the step F101, the processing sequence proceeds from the step F102 to a step F103, where the CPU 11 refers to the setting table. Thus, the CPU 11 acquires output part information and control information associated with the current device environmental condition.

Subsequently, in a step F104, the CPU 11 sets output parts of video signals and audio signals according to the acquired output part information, and implements control or transmits control information according to the acquired control information.

The processing of FIG. 9 is repeatedly carried out until it is determined in a step F105 that the system has been terminated, i.e., the system has been powered off.

When the contents of the setting table are those shown in FIG. 8A, the processing in the step F104 is as follows.

Specifically, if the processing sequence proceeds to the steps F103 and F104 after a determination is made that the device environmental condition corresponds to the non-coupled state, the CPU 11 checks the video output part, the audio output part and the volume level corresponding to HANDY in the setting table of FIG. 8A. For HANDY, the video output part is set to the main-body display and the audio output part is set to the main-body speaker. Therefore, of content signals reproduced in the storage unit 6, a reproduced video signal is supplied to the display driver 21 by the CPU 11 so that the display 2 outputs video. In addition, a reproduced audio signal is supplied to the audio processor 22 so that the speaker 3 outputs audio. Furthermore, the CPU 11 implements control so that the audio processor 22 sets the volume level to 1.

That is, when the reproducing device 1 is used alone and reproduces content, the reproduced video and audio are output by the display 2 and the speaker 3, respectively, mounted on the reproducing device 1. The basic volume level is set to 1. It is obvious that the volume level may be changed from 1 that is the basic value in response to volume operation by a user.

If it is determined that the device environmental condition corresponds to the state where the reproducing device 1 is coupled to the vehicle cradle 50 and the vehicle is in the stopped state, and then the processing sequence proceeds to the steps F103 and F104, the CPU 11 checks the video output part, the audio output part and the volume level corresponding to CAR/STOP in the setting table of FIG. 8A.

For CAR/STOP, the video output part is set to the main-body & rear displays, and the audio output part is set to the F/R speakers. Therefore, of content signals reproduced in the storage unit 6, a reproduced video signal is supplied to the display driver 21 by the CPU 11 so that the display 2 outputs video. Furthermore, the reproduced video signal is also supplied to the cradle interface 23, followed by being output via the vehicle cradle 50 to the video processing and interface unit 74 in the car AV amplifier 70 in FIG. 5. The video signal processed by the video processing and interface unit 74 is supplied to the display 85 and is subjected to display output.

In addition, the CPU 11 supplies a reproduced audio signal to the cradle interface 23 without supplying it to the audio processor 22. Thus, the reproduced audio signal is supplied via the vehicle cradle 50 to the audio processor 73 in the car AV amplifier 70 in FIG. 5. The audio signal processed by the audio processor 73 is output as audio from the front speakers 84F and the rear speakers 84R.

Furthermore, the CPU 11 sends to the cradle interface 23 the control information C1 for setting the volume level to 5, so that the control information C1 is output via the vehicle cradle 50 to the controller 71 in the car AV amplifier 70. Together with the volume level information, information on the video and audio output parts is also output to the controller 71 as one piece of the control information C1.

In accordance with the control information C1 as the instruction to set the audio output part to the F/R speakers and set the volume level to 5, the controller 71 in the car AV amplifier 70 causes the audio processor 73 to execute processing for the reproduced audio signal SA supplied from the reproducing device 1 and perform volume adjustment processing of setting the volume level to 5, so that the processed audio signal is supplied to the front speakers 84F and the rear speakers 84R.

In addition, in accordance with the control information C1 specifying the rear display as one of the video output parts, the controller 71 causes the video processing and interface unit 74 to process the reproduced video signal SV supplied from the reproducing device 1 and supply the processed video signal to the display 85.

That is, when the reproducing device 1 is coupled to a vehicle AV system and the vehicle is in the stopped state, reproduced video arising from content reproduction in the reproducing device 1 is displayed on both the display 2 and the display 85.

Specifically, when a vehicle has a system arrangement like one in FIG. 4, persons at the driver seat and the front-passenger seat can watch the reproduced video through the display 2 of the reproducing device 1, while persons at the rear seats can watch the reproduced video through the display 85.

As for reproduced audio, the front speakers 84F and the rear speakers 84R offer audio with a higher quality compared with audio from the speaker 3 of the reproducing device 1. Furthermore, the basic volume level is set to 5. This level is a comparatively high level adequate for environments in a vehicle, where noise is comparatively large. It is obvious that the volume level may be changed from 5 as the basic value in response to operation by a user.

If it is determined that the device environmental condition corresponds to the state where the reproducing device 1 is coupled to the vehicle cradle 50 and the vehicle is running, and then the processing sequence proceeds to the steps F103 and F104, the CPU 11 checks the video output part, the audio output part and the volume level corresponding to CAR/RUN in the setting table of FIG. 8A.

For CAR/RUN, the video output part is set to the rear display, and the audio output part is set to the rear speakers. Therefore, of content signals reproduced in the storage unit 6, a reproduced video signal is supplied to the cradle interface 23 by the CPU 11 without being supplied to the display driver 21. The reproduced video signal is output via the vehicle cradle 50 to the video processing and interface unit 74 in the car AV amplifier 70 in FIG. 5. The video signal processed by the video processing and interface unit 74 is supplied to the display 85 and is subjected to display output.

In addition, the CPU 11 supplies a reproduced audio signal to the cradle interface 23 without supplying it to the audio processor 22. Thus, the reproduced audio signal is supplied via the vehicle cradle 50 to the audio processor 73 in the car AV amplifier 70 in FIG. 5. The audio signal processed by the audio processor 73 is output as audio only from the rear speakers 84R.

Furthermore, the CPU 11 sends to the cradle interface 23 the control information C1 for setting the volume level to 7, so that the control information C1 is output via the vehicle cradle 50 to the controller 71 in the car AV amplifier 70. Together with the volume level information, information on the video and audio output parts is also output to the controller 71 as one piece of the control information C1.

In accordance with the control information C1 as the instruction to set the audio output part to the rear speakers and set the volume level to 7, the controller 71 in the car AV amplifier 70 causes the audio processor 73 to execute processing for the reproduced audio signal SA supplied from the reproducing device 1 and perform volume adjustment processing of setting the volume level to 7, so that the processed audio signal is supplied only to the rear speakers 84R.

In addition, in accordance with the control information C1 specifying the rear display as the video output part, the controller 71 causes the video processing and interface unit 74 to process the reproduced video signal SV supplied from the reproducing device 1 and supply the processed video signal to the display 85.

That is, when the reproducing device 1 is coupled to a vehicle AV system and the vehicle is running, reproduced video arising from content reproduction in the reproducing device 1 is displayed only on the display 85.

Specifically, when a vehicle has a system arrangement like one in FIG. 4, reproduced video is not output by the reproducing device 1 mounted near the driver seat, and therefore the driver cannot watch the reproduced video. In contrast, persons at the rear seats can watch the reproduced video through the display 85.

As for reproduced audio, the front speakers 84F in the vehicle AV system do not output audio, while only the rear speakers 84R offer audio with a higher quality compared with audio from the speaker 3 of the reproducing device 1. Furthermore, the basic volume level is set to 7. This level is a comparatively high level adequate for environments in a running vehicle, where noise is large in particular. It is obvious that the volume level may be changed from 7 as the basic value in response to operation by a user.

Since only the display 85 for the rear seats displays video and only the rear speakers 84R output audio when the vehicle is running, the driver cannot watch reproduced content. That is, outputting reproduced content only for the rear seats during driving of a vehicle can prevent safety failure due to watching of reproduced video by a driver.

If a determination is made that the device environmental condition corresponds to the state where the reproducing device 1 is coupled to the home cradle 60 and then the processing sequence proceeds to the steps F103 and F104, the CPU 11 checks the video output part, the audio output part and the volume level corresponding to HOME in the setting table of FIG. 8A.

For HOME, the video output part is set to the home display, and the audio output part is set to the home speaker. Therefore, of content signals reproduced in the storage unit 6, a reproduced video signal is supplied to the cradle interface 23 by the CPU 11 without being supplied to the display driver 21. The reproduced video signal is output via the home cradle 60 to the video processing and interface unit 94 in the home AV amplifier 90 in FIG. 7. The video signal processed by the video processing and interface unit 94 is supplied to the home display 100 and is subjected to display output.

In addition, the CPU 11 supplies a reproduced audio signal to the cradle interface 23 without supplying it to the audio processor 22. Thus, the reproduced audio signal is supplied via the home cradle 60 to the audio processor 93 in the home AV amplifier 90 in FIG. 7. The audio signal processed by the audio processor 93 is output as audio from the speakers 101L and 101R.

Furthermore, the CPU 11 sends to the cradle interface 23 the control information C1 for setting the volume level to 3, so that the control information C1 is output via the home cradle 60 to the controller 91 in the home AV amplifier 90. Together with the volume level information, information on the video and audio output parts is also output to the controller 91 as one piece of the control information C1.

In accordance with the control information C1 as the instruction to set the audio output part to the home speaker and set the volume level to 3, the controller 91 in the home AV amplifier 90 causes the audio processor 93 to execute processing for the reproduced audio signal SA supplied from the reproducing device 1 and perform volume adjustment processing of setting the volume level to 3, so that the processed audio signal is supplied to the speakers 101L and 101R.

In addition, in accordance with the control information C1 specifying the home display as the video output part, the controller 91 causes the video processing and interface unit 94 to process the reproduced video signal SV supplied from the reproducing device 1 and supply the processed video signal to the display 100.

That is, when the reproducing device 1 is coupled to a home AV system and produces content, the reproduced video is displayed on the display 100. Specifically, through the display 100 in a home or the like, reproduced video with a higher definition than video by the display 2 can be watched.

As for reproduced audio, the speakers 101L and 101R in the home AV system offer audio with a higher quality compared with audio from the speaker 3 of the reproducing device 1. Furthermore, the basic volume level is set to 3. This level is a comparatively low level adequate for environments in a room, where noise is small. It is obvious that the volume level may be changed from 3 as the basic value in response to operation by a user.

Specific processing examples have been described above. However, it should be noted that this processing depends on the registered information in the setting table. Since a user can edit the setting table as described above, the information can be changed adequately for a home AV system and a vehicle AV system owned by the user, and this information change allows adequate reproduction output according to the device environmental condition.

Depending on the registered contents in the setting table, the following reproduction output ways are also available for example. Specifically, when the reproducing device 1 is coupled to a home AV system, reproduced video may be output through both the display 100 and the main-body display 2. In addition, when the reproducing device 1 is coupled to a vehicle AV system, audio may be output from the main-body speaker 3 in addition to the front speakers 84F and the rear speakers 84R.

Although the above-described processing examples relate to outputting of audio/video when content is reproduced, similar processing is also applicable to video and audio signals produced through navigation operation.

6. Advantageous Effects of Embodiment and Modifications

According to the reproducing device 1 of the above-described embodiment, output parts of video and audio are set depending upon the device environmental condition when the reproducing device 1 is used, and control depending upon the device environmental condition is executed. Thus, adequate operation is executed according to the device environmental conditions.

When the reproducing device 1 is used alone, video and audio of reproduced content are output by use of the main-body display 2 and the speaker 3. In contrast, when the reproducing device 1 is coupled to a vehicle AV system or a home AV system, video and audio can be output through the display (85, 100) and the speakers (84F, 84R, 101L, 101R) in the coupled system. Therefore, even if the main body of the reproducing device 1 itself is not provided with high-performance display 2 and speaker 3, the reproducing device 1 can utilize the reproduction ability of the home AV system and vehicle AV system, to thereby allow a user to enjoy high-quality reproduced video and audio. In addition, a user does not need to implement operation of switching the output part every time the device environmental condition has changed. Therefore, the need for troublesome operation is eliminated, which offers good usability.

A user is allowed to merely use the reproducing device 1 in any coupling state or in the non-coupled state with any usage, and the optimal reproduction output way adequate for the device environmental condition can be achieved automatically.

In addition, for a vehicle AV system, the output part is switched depending on which of the running state and the stopped state the vehicle is in, which can ensure safety during the driving of the vehicle.

Furthermore, changing the registered contents in the setting table allows settings adequate for a system and equipment used by a user, which can offer optimal operation conditions for each individual user.

Specifically, there is diversity in a reproduction equipment environment depending on a user, such as the presence or absence of a speaker in a home, and the presence or absence of the display 85 for rear seats in a vehicle. However, customizing the registered information in the setting table according to the equipment environment allows each user to achieve adequate reproduction output.

As described with FIGS. 5 and 7, operation input through the remote commander RC or the operation input unit 72 or 92 is transferred to the reproducing device 1 as the operation signal S3, and the CPU 11 executes control in accordance with the operation signal S3. That is, a user can implement operation relating to content reproduction or a navigation function in the reproducing device 1 with use of operating units of a vehicle AV system or a home AV system, which offers high convenience. For example, it is natural for a person who is at a rear seat in a car and watches reproduced content through the display 85 to operate the remote commander RC in hand with directing it toward the display 85. Since operation signals can be transmitted to the reproducing device 1 by such an operation way, a user can carry out operation regarding currently watched reproduced content through natural operation. This operation way offers an adequate user-interface with good usability.

The present invention is not limited to the configurations and operations of the above-described embodiment, but a great variety of modifications are available.

As a method for determining the kind of a cradle, which corresponds to the device environmental condition of the reproducing device 1, besides the above-described method in which the voltage levels of the coupling determination terminals are detected, the following method is also available. Specifically, cradles are provided with a projection/recess shape or the like different for each cradle kind, and the projection/recess shape or the like is determined by use of a mechanical switch of the connector 24.

Alternatively, a discrimination signal may be supplied to the reproducing device 1 not from the cradle itself but from an external device coupled via the cradle, such as the car AV amplifier 70 or the home AV amplifier 90.

In addition, in terms of the difference in a power supply between a car AV system and a home AV system, the coupled cradle may be determined depending on the supply voltage provided via the cradle to the reproducing device 1. That is, a determination is made as to whether the provided voltage is the voltage from the car battery 81 or the voltage arising from AC/DC conversion from a home AC power supply. In addition, if both a DC supply voltage from the car battery 81 and an AC voltage from a home AC power supply are directly supplied to the reproducing device 1, it is also possible to determine the provided supply voltage based on the difference in the voltage variation, ripple component, voltage value, etc. between the DC and AC voltages to thereby determine the coupled system.

Moreover, a determination as to whether or not the reproducing device 1 is in a vehicle is allowed also by a detection signal from the sensor device 83 and position information from the position detection device 82.

It is also possible to determine the device environmental condition based on information acquired through network communication or the like by the communication unit 8.

If detection of the place of use as the device environmental condition is intended, the reproducing device 1 may be provided with a communication section for a network such as a local area network (LAN) or a wide area network (WAN). Examples of this communication section include a section for wire communication such as USB, a section for wireless communication such as Bluetooth, and an off-line communication section employing a memory medium such as a memory card.

The reproducing device 1 may be coupled to an AV system via a connector or wireless communication such as a personal area network (PAN) instead of the cradle 50 or 60. It is obvious that the respective units in a vehicle AV system and a home AV system may also be coupled to each other over wireless communication such as a wireless LAN.

The coupling configuration between the reproducing device 1 and an AV system is not limited to the above-described examples, in which the car AV amplifier 70 and the home AV amplifier 90 directly send and receive various signals to and from the reproducing device 1 via the cradles 50 and 60, respectively. The reproducing device 1 may be coupled to a plurality of apparatuses in parallel, and various signals may be exchanged among the respective apparatuses.

In addition, various signals in addition to the above-described signals may be exchanged between the reproducing device 1 and an external device (the car AV amplifier 70 etc.) via e.g. a cradle. A content signal may be transmitted as an analog signal, or may be a digital signal.

In addition, a cradle itself may be provided with functions of the car AV amplifier 70 or the home AV amplifier 90, i.e., functions of the central unit in an AV system.

The device environmental conditions differentiated from each other in a setting table are not limited to the above-described four conditions. For example, the state where the reproducing device 1 is coupled to a vehicle AV system and the engine of the vehicle is in the off-state is also possible as one device environmental condition. In addition, when plural home AV systems exist in a home, the device environmental conditions may be differentiated depending on which of the systems is coupled to the reproducing device 1.

Moreover, not only the coupled system and vehicle operation state but also the time and season can be used as conditions for differentiating the device environmental conditions. For example, if time is classified into before noon, afternoon, and night as the different device environmental conditions, output settings according to the respective time zones is possible. Specifically, e.g. setting of volume levels depending on time zones is possible.

In addition, besides the video output part, audio output part and volume level, other various kinds of information to be registered are also possible.

It is also possible to allow display luminance, resolution, etc. in video reproduction to be specified depending on the device environmental condition. This specifying permits output control according to the performance of the display used for output and the luminance of the position where the display is placed. Specifically, different basic luminance levels may be assigned to a vehicle and a home, respectively, for example. In addition, if the time zone is one of factors in differentiating the device environmental conditions, the luminance level may be changed depending on a time zone.

In addition, regarding audio reproduction, not only the voltage level but also the equalizer settings, bass boost settings, output channel settings, etc. may be used as information to be registered in a setting table. Since adequate equalizing and bass boost conditions in a vehicle will be different from those in a home, it is preferable that these conditions are automatically controlled depending on the device environmental condition.

If it is allowed to set the output channel to any of three channels of mono, L/R stereo, and L/R/rear, 5.1 surround, etc., output control according to a system owned by a user is possible.

In addition, the reproducing device 1 may include a receiver for television broadcasting, radio broadcasting, etc. as a component corresponding to a reproducer set forth in claims of the invention. In this case, the output part of the received audio and video signals may be determined based on a setting table, similarly to content reproduced in the storage unit 6.

In a vehicle AV system like one in FIG. 4, the rear display 85 may also be equipped with the reproducing device 1. That is, the vehicle cradle 50 may be provided also on the rear side so that the reproducing device 1 can be attached thereto.

The reproducing device 1 may detect which of the front-side cradle and the rear-side cradle the coupled vehicle cradle 50 is, to thereby determine the device environmental condition. When the reproducing device 1 is mounted to the rear-side cradle, there is no problem in outputting video of reproduced content from the display 2 of the reproducing device 1 even when the vehicle is running. Therefore, the setting table can be set so that the main-body display (the display 2) is specified as the video output part when the reproducing device 1 is mounted to the rear-side cradle.

What is claimed is:

1. A reproducing device comprising:
    reproducing means for reproducing an audio signal and/or a video signal;
    main-body output means for outputting the video signal and/or the audio signal reproduced by the reproducing means on a plurality of output means of the reproducing means;
    external output means for outputting the video signal and/or the audio signal to an external device coupled to the reproducing device;
    storage means for storing a setting table including output part information and control information associated with a device environmental condition, the output part information includes a subset of output means; and control means for determining the device environmental condition by detecting when the reproducing device is coupled to a first apparatus, when the reproducing device is coupled to a second apparatus different from the first apparatus, and when the reproducing device is not coupled to any apparatus; for acquiring output part information including the subset of output means and control information corresponding to the determined device environmental condition from the setting table; for setting an output part for the video signal and/or the audio signal reproduced by the reproducing means to operate the subset of output means identified by the acquired output part information; and for controlling the output means based on the acquired control information.

2. The reproducing device according to claim 1, wherein the first apparatus is a vehicle apparatus and the second apparatus is a home apparatus.

3. The reproducing device according to claim 2, wherein the control means for determining the device environmental condition further determines whether a vehicle is in a moving state or in a stopped state as a part of the device environmental condition, when the control means determines that the reproducing device is coupled to the vehicle apparatus.

4. The reproducing device according to claim 3, wherein
when the reproducing device is coupled to the vehicle apparatus and the vehicle is in the moving state, the output part for the video signal is set to operate a rear display of the vehicle, and the output part for the audio signal is set to operate a rear speaker of the vehicle;
when the reproducing device is coupled to the vehicle apparatus and the vehicle is in the stopped state, the output part for the video signal is set to operate a main-body display of the reproducing device and the rear display of the vehicle, and the output part for the audio signal is set to operate a front speaker and the rear speaker of the vehicle;
when the reproducing device is coupled to the home apparatus, the output part for the video signal is set to operate a home display, and the output part for the audio signal is set to operate a home speaker; and
when the reproducing device is not coupled to any apparatus, the output part for the video signal is set to operate the main-body display of the reproducing device, and the output part for the audio signal is set to operate a main-body speaker of the reproducing device.

5. The reproducing device according to claim 1, wherein the storage means stores output part information and control information in the setting table for each of a state including:
where the reproducing device is coupled to a vehicle apparatus and a vehicle is in a moving state,
where the reproducing device is coupled to the vehicle apparatus and the vehicle is in a stopped state,
where the reproducing device is coupled to a home apparatus, and
where the reproducing device is not coupled to any apparatus, as device environmental conditions.

6. The reproducing device according to claim 1, further comprising:
setting change means for changing settings of output part information and control information registered in the setting table.

7. The reproducing device according to claim 1, wherein the control means outputs a signal based on the acquired control information to an external device, when the control means has determined that the reproducing device is coupled to the external device in determining of the device environmental condition.

8. The reproducing device according to claim 1, wherein the acquired control information represents a volume level of the output means corresponding to the determined device environmental condition in the setting table.

9. The reproducing device according to claim 1, wherein
when the reproducing device is coupled to the first apparatus, the output part for the video signal is set to operate a display of the first apparatus and the output part for the audio signal is set to operate at least one speaker of the first apparatus;
when the reproducing device is coupled to the second apparatus, the output part for the video signal is set to operate a display of the second apparatus and the output part for the audio signal is set to operate at least one speaker of the second apparatus; and
when the reproducing device is not coupled to any apparatus, the output part for the video signal is set to operate a display of the reproducing device, and the output part for the audio signal is set to operate a speaker of the reproducing device.

10. A reproducing method, implemented on a reproducing device, comprising:
storing a setting table including output part information and control information associated with a device environmental condition, the output part information includes a subset of output means;
determining, by a processor, the device environmental condition by detecting when the reproducing device is coupled to a first apparatus, when the reproducing device is coupled to a second apparatus different from the first apparatus, and when the reproducing device is not coupled to any apparatus;
acquiring output part information including the subset of output means and control information corresponding to the determined device environmental condition from the storage table; and
setting an output part for a reproduced audio signal and/or a reproduced video signal to operate the subset of output means identified by the acquired output part information; and
controlling an output unit based on the acquired control information.

11. The reproducing method according to claim 10, wherein the first apparatus is a vehicle apparatus and the second apparatus is a home apparatus.

12. The reproducing method according to claim 11, wherein the device environmental condition determined further includes whether a vehicle is in a moving state or in a stopped state, when it has been determined that the reproducing device is coupled to the vehicle apparatus.

13. The reproducing method according to claim 12, wherein setting the output part includes:
setting the output part for the video signal to operate a rear display of the vehicle, and the output part for the audio signal to operate a rear speaker of the vehicle, when the reproducing device is coupled to a vehicle apparatus and a vehicle is in a moving state;
setting the output part for the video signal to operate a main-body display of the reproducing device and the rear display of the vehicle, and the output part for the audio signal to operate a front speaker and the rear speaker of the vehicle, when the reproducing device is coupled to a vehicle apparatus and a vehicle is in a stopped state;

setting the output part for the video signal to operate a home display, and the output part for the audio signal to operate a home speaker, when the reproducing device is coupled to a home apparatus; and setting the output part for the video signal to operate the main-body display of the reproducing device, and the output part for the audio signal to operate a main-body speaker of the reproducing device, when the reproducing device is not coupled to any apparatus.

14. The reproducing method according to claim 10, wherein the setting table includes output part information and control information registered for each of a state where the reproducing device is coupled to a vehicle apparatus as the first apparatus and the vehicle is in a moving state, the reproducing device is coupled to the vehicle apparatus as the first apparatus and the vehicle is in a stopped state, the reproducing device is coupled to a home apparatus as the second apparatus, and the reproducing device is not coupled to any apparatus, as the device environmental conditions.

15. The reproducing method according to claim 10, further comprising:
changing settings of output part information and control information registered in the setting table.

16. The reproducing method according to claim 10, wherein a signal based on the acquired control information is output to the output part, when it has been determined that the reproducing device is coupled to an external device.

17. The reproducing method according to claim 10, wherein the control of the output unit based on the acquired control information includes a control of volume level.

18. A reproducing apparatus comprising:
a reproducing unit configured to reproduce an audio signal and/or a video signal;
a main-body output unit configured to output the video signal and/or the audio signal reproduced by the reproducing unit on a plurality of output units of the reproducing unit;
an external output unit configured to output the video signal and/or the audio signal to an external device coupled to the reproducing apparatus;
a storage unit configured to store a setting table in which output part information including a subset of output units and control information associated with a device environmental condition are registered; and
a control unit, including a processor, configured to determine the device environmental condition by detecting when the reproducing device is coupled to a first apparatus, when the reproducing device is coupled to a second apparatus different from the first apparatus, and when the reproducing device is not coupled to any apparatus, to acquire output part information including the subset of output units and control information corresponding to the determined device environmental condition from the setting table, to set an output part for the video signal and/or the audio signal reproduced by the reproducing unit to operate the subset of output units identified by the acquired output part information, and to control the output unit based on the acquired control information.

* * * * *